United States Patent Office 3,494,973
Patented Feb. 10, 1970

3,494,973
STABILIZED COMPOSITION
Joseph B. Wolheim, Brooklyn, N.Y., and Alvin Hass, Elgin, Ill., assignors, by mesne assignments, to Allied Chemical Corporation, New York, N.Y., a corporation of New York
No Drawing. Continuation-in-part of application Ser. No. 226,161, Sept. 25, 1962. This application May 23, 1967, Ser. No. 640,466
Int. Cl. C07c 23/46
U.S. Cl. 260—648           4 Claims

ABSTRACT OF THE DISCLOSURE

Dodecachlorooctahydro - 1,3,4 - metheno - 2H - cyclobuta[CD]pentalene is stabilized with a 2,4,6 - trialkyl phenol. The composition may be mixed with a thermoplastic polymer to give a heat stable flame retardant composition.

---

The present application is a continuation-in-part of U.S. application Ser. No. 226,161, filed Sept. 25, 1962, now abandoned.

The present invention relates to a novel and useful composition and a method of stabilizing a composition.

The compound of the structure

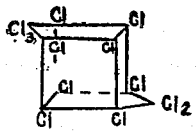

which is hereinafter referred to as dodecachlorooctahydro-1,3,4-metheno-2H-cyclobuta[C D]pentalene is well-known in the art as being inert to strong oxidizing agents such as sulfuric acid, nitric acid, aqueous sodium hydroxide, lithium aluminum hydride, hydrogen, oxygen, etc. under normal conditions. A suggested use for the material is in admixture with thermoplastic materials and particularly polyethylene and polypropylene. One disadvantage of the compound, however, is that at temperatures in the range of about 400° F. and above the material undergoes degradation and becomes quite colored within a short period of time. Obviously, where the compound is to be used at high temperatures such as when mixed with thermoplastic polymers at extrusion temperatures, the composition must be stable to prevent undesirable discoloration in the final product. If a relatively simple and inexpensive method were developed which would reduce or eliminate such discoloration of the compound at elevated temperatures or polymer composition at melt temperatures, it would represent a significant advance in the art.

It is an object of the present invention to provide a method of stabilizing dodecachlorooctahydro-1,3,4-metheno-2H-cyclobuta[C D]pentalene against discoloration at elevated temperatures. A further object is to provide a thermoplastic polymer composition containing the compound which remains stable at elevated temperatures with substantially no discoloration of the final product. Other objects will become apparent as the description of the invention proceeds.

These objects are accomplished by the present invention which provides a method of stabilizing dodecachlorooctahydro - 1,3,4 - metheno - 2H - cyclobuta[C D]pentalene at elevated temperatures which comprises the addition of a stabilizing amount of 2,4,6-trialkyl phenol. In a preferred embodiment of the present invention, the 2, 4,6-trialkyl phenol is 2,6-ditertiary-butyl-para-cresol and it is employed in amounts of from about 0.5% to about 20% by weight based on the weight of the compound to be stabilized. In a still more preferred embodiment of the present invention, 2,6 - ditertiary-butyl-para-cresol is used in amounts from about 5% to about 10% by weight.

The present invention also provides a composition of matter comprising dodecachlorooctahydro-1,3,4-metheno-2H-cyclobuta[C D]pentalene and a stabilizing amount of a 2,4,6-trialkyl phenol. In a preferred embodiment, the composition also contains a thermoplastic polymer such as polyethylene or polypropylene which is present in amount of about 40% to about 90% by weight.

The term "stabilizing amount" is used to signify any amount which will accomplish stabilization under the conditions to which the composition is to be subjected. For example, at lower temperatures a very small amount of stabilizer is employed. At temperatures approaching or exceeding 400° F. about 0.5% to about 20% by weight will accomplish the desired result. It should be noted, however, that even a minute amount of the stabilizer aids to some extent the stabilization of the compound.

In carrying out the process of the present invention the ingredients need only be physically mixed. They may be mixed by hand, a conventional paddle mixer or any other convenient means.

When stabilized, the compound with the stabilizer may be directly added to thermoplastic polymers such as polyethylene and polypropylene in the molten state without discoloration of the final product.

While polyethylene and polypropylene are preferred polymers, various homopolymers and copolymers of unsaturated aliphatic, cycloaliphatic and aromatic hydrocarbons can be utilized. Among the various suitable monomers are ethylene, propylene, butene, pentene, hexene, heptene, octene, 2-methylpropene-1, 4-methylpentene-1, bicyclo-(2.2.1)-2-heptene, hexadiene, 2,3 - dimethylbutadiene-1,3, 2-methylpentadiene-1,3, 4 - vinylcyclohexene, cyclopentadiene, styrene, methyl styrene and the like. Ethylene/propene rubbers may also be used.

The compositions containing such polymers and stabilizers have increased flame retardancy and are very much more heat stable than the polymers per se.

The following examples are given to illustrate the invention and are not intended to limit it in any manner. All parts are given in parts by weight unless otherwise expressed.

EXAMPLES

Procedure A—control

In order to test the effectiveness of the additives to the compound dodecachlorooctahydro-1,3,4-metheno-2H-cyclobuta[C D]pentalene, 1 gram of the compound is added to each of six 25 cc. test tubes containing about 15 cc. of commercial clear mineral oil. The tubes are suspended in a silicone oil bath and heated at 450° F. At 10 minute intervals, one test tube is removed from the bath and visually examined for discoloration. After 10 minutes, the first sample removed shows a slight discoloration in both the mineral oil and the compound in the bottom of the test tube. The sample removed after 20 minutes shows a medium dark yellowing in the mineral oil and a noticeable darkening of the compound in the bottom of the test tube. The sample removed after 30 minutes shows a rather dark amber color in the mineral oil and a very noticeable darkening of the compound in the bottom of the test tube. The sample removed after 40 minutes shows a dark amber color in the mineral oil and a further darkening of the compound in the bottom of the test tube. The sample removed after 50 minutes shows an almost black color in the mineral oil and a very dark brown color in the compound in the bottom of the test tube.

EXAMPLES 1-9

The control procedure above is repeated employing 9 separate test tubes, each of which contains about 15 cc. of commercial clear mineral oil, 1 gram of the compound dodecachlorooctahydro - 1,3,4 - metheno-2H-cyclobuta [C D]pentalene and 0.1 gram of 2,6-ditertiary-butyl-para-cresol. At 10 minute intervals, one test tube is removed from the bath and observed visually. The test tubes removed at the end of 10, 20, 30 and 40 minute intervals show no discoloration whatsoever in the mineral oil or in the compound at the bottom of the tube. The test tubes removed at 50, 60 and 70 minute intervals show a very faint yellowing of the mineral oil, but the compound remains white. The test tubes removed at the 80 and 90 minute intervals show a very slight yellowing of the mineral oil but the compound remains unchanged in color in the bottom of the test tube.

EXAMPLE 10

When the above procedure is repeated employing 1% by weight of 2,6-ditertiary-butyl-para-cresol, the increased stability is again noted, although it is not as effective as when employing the larger amounts of additives as in Examples 1-9.

EXAMPLE 11

In a Banbury mixer is placed 1,000 grams of commercial polypropylene having a melt flow of 5.0 and a density of 0.901. Then, 200 grams of dodecachlorooctahydro-1,3,4 - metheno-2H-cyclobuta[CD]pentalene, 100 grams of antimony trioxide and 20 grams of 2,6-ditertiary-butyl-para-cresol. The mixture is blended together at a temperature of about 350° F. for about 15 minutes at which time a homogeneous mixture results. The mixture is sheeted out in a two-roll mill and ground in a Ball & Jewel Grinder. The resulting granules are injection molded at 450° F. by conventional means into 3" x 4" x 0.12" plaques. The plaques are visually examined for discoloration and no discoloration whatsoever is noted. The composition is self-extinguishing according to ASTM D-635-565.

When the same procedure is employed omitting the 20 grams of 2,6-ditertiary-butyl-para-cresol, the plaques show substantial discoloration even though they are injection molded at 400° F. rather than 450° F.

EXAMPLE 12

When the procedure of Example 11 is repeated employing a commercial high density polyethylene, substantially the same results are obtained.

EXAMPLE 13

When the procedure of Example 11 is repeated employing 2,4-dimethyl-6-tertiary-butyl-phenol in place of 2,6-ditertiary-butyl-para-cresol, substantially the same results are obtained.

While in the above examples the composition contains only the essential components, it is obvious that other materials such as dyes, pigments, fibers, fillers, plasticizers and the like may be introduced into the composition without substantial alternation of the desired physical properties.

In fabricating such a composition, the standard procedures such as blow-molding, injection molding and extrusion molding can be used to form molded articles such as tubing, plastic toys, dishes, plastic parts and the like.

Many equivalent modifications will be apparent to those skilled in the art from a reading of the foregoing without a departure from the inventive concept.

What is claimed is:

1. A composition of matter comprising the compound

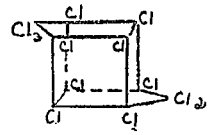

and a stabilizer for said compound consisting essentially of a 2,4,6-trialkyl phenol.

2. The composition of matter of claim 1 wherein the 2,4,6-trialkyl phenol is 2,6-ditertiary-butyl-para-cresol.

3. The composition of matter of claim 2 wherein the 2,6-ditertiary-butyl-para-cresol is employed in amounts of from about 0.5% to about 20% by weight based on the weight of said compound.

4. The composition of matter of claim 2 wherein the 2,6-ditertiary-butyl-para-cresol is employed in amounts of from about 5% to about 10% by weight based on the weight of said compound.

References Cited

UNITED STATES PATENTS

| | | | |
|---|---|---|---|
| 1,996,717 | 4/1935 | Carlisle | 260—652.5 |
| 2,841,625 | 7/1958 | Burch et al. | 260—652.5 |
| 2,999,887 | 9/1961 | Finlay | 260—652.5 |
| 2,625,521 | 1/1953 | Fischer et al. | 260—45.95 XR |
| 2,919,259 | 12/1959 | Naylor et al. | 260—45.95 |
| 3,385,818 | 5/1968 | Kauder et al. | 260—45.75 XR |
| 3,424,717 | 1/1969 | Gottlieb et al. | 260—45.95 XR |

FOREIGN PATENTS 761,685  11/1956  Great Britain.

OTHER REFERENCES

McBee et al.: J. Am. Chem. Soc., vol. 78, pp. 1511 to 1512 (1956).

BERNARD HELFIN, Primary Examiner

H. T. MARS, Assistant Examiner

U.S. Cl. X.R.

260—45.95